US010100734B2

(12) United States Patent
Sheoran et al.

(10) Patent No.: US 10,100,734 B2
(45) Date of Patent: Oct. 16, 2018

(54) MULTI-CHANNEL PARTICLE SEPARATOR

(71) Applicant: HONEYWELL INTERNATIONAL INC., Morristown, NJ (US)

(72) Inventors: Yogendra Yogi Sheoran, Scottsdale, AZ (US); Jennifer Ann Reich, Chandler, AZ (US); Bruce Dan Bouldin, Phoenix, AZ (US); Zedic Daniel Judd, Phoenix, AZ (US); John Taylor Pearson, Phoenix, AZ (US); Cristopher Frost, Scottsdale, AZ (US); Yates Wong, Humboldt, AZ (US); David Chou, Phoenix, AZ (US); Eduardo Guerra, Queen Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 670 days.

(21) Appl. No.: 14/629,739

(22) Filed: Feb. 24, 2015

(65) Prior Publication Data
US 2016/0245176 A1    Aug. 25, 2016

(51) Int. Cl.
*B01D 49/00*    (2006.01)
*F02C 7/052*    (2006.01)
(Continued)

(52) U.S. Cl.
CPC .............. *F02C 7/052* (2013.01); *B01D 45/06* (2013.01); *B01D 45/08* (2013.01); *B01D 45/16* (2013.01);
(Continued)

(58) Field of Classification Search
CPC .. F02C 7/052; F02C 7/055; F02C 7/05; F05D 2210/12; F05D 2220/50; B01D 45/08;
(Continued)

(56) References Cited

U.S. PATENT DOCUMENTS 2,189,234 A  *  2/1940  Wagner .................. B01D 45/08
                                                        110/119
2,425,508 A  *  8/1947  Chilton .................. B64D 33/02
                                                        123/198 E
(Continued)

FOREIGN PATENT DOCUMENTS

EP          0012252 A1      6/1980

OTHER PUBLICATIONS

Musgrove, G., et al. "Computational Design of a Louver Particle Separator for Gas Turbine Engines," Proceedings of ASME Turbo Expo, 2009.
(Continued)

*Primary Examiner* — Dung H Bui
(74) *Attorney, Agent, or Firm* — Lorenz & Kopf, LLP (57) ABSTRACT

A multi-channel particle separator includes a plurality of vanes. Each vane is spaced apart from at least one other adjacent vane to define a flow channel, and includes a leading edge, a trailing edge, a first side wall, a second sidewall, and a splitter. The first side wall extends between the leading edge and the trailing edge. The second side wall is spaced apart from the first side wall and extends from the leading edge toward the trailing edge. The splitter may be rotationally coupled to the trailing edge and extend toward the leading edge. The splitter is spaced apart from the first side wall to define a scavenge volume and is rotatable between an extended position and a retracted position. The vanes may also or instead be coupled to a ring-shaped structure.

6 Claims, 9 Drawing Sheets

(51) Int. Cl.
*B01D 45/08* (2006.01)
*B01D 45/06* (2006.01)
*B01D 45/16* (2006.01)
*B01D 50/00* (2006.01)
*F02C 7/055* (2006.01)
*B64D 33/02* (2006.01)
*A47L 9/16* (2006.01)

(52) U.S. Cl.
CPC .......... *B01D 50/002* (2013.01); *A47L 9/1683* (2013.01); *B01D 2273/10* (2013.01); *B01D 2279/60* (2013.01); *B64D 33/02* (2013.01); *F02C 7/055* (2013.01); *F05D 2210/12* (2013.01); *F05D 2220/50* (2013.01); *Y02T 50/671* (2013.01)

(58) Field of Classification Search
CPC  B01D 2273/10; B01D 2279/60; B01D 45/06; B01D 45/16; B01D 50/002; Y02T 50/671; B64D 33/02; A47L 9/1683
See application file for complete search history.

(56) References Cited

U.S. PATENT DOCUMENTS

| | | | | |
|---|---|---|---|---|
| 3,050,937 A * | 8/1962 | James | | F02K 1/605 239/265.29 |
| 3,329,377 A * | 7/1967 | Gudmundur | | B64D 15/00 244/53 B |
| 3,362,155 A * | 1/1968 | Driscoll | | F02C 7/05 415/121.2 |
| 3,465,950 A * | 9/1969 | Duffy | | F02C 7/05 415/121.2 |
| 3,483,881 A * | 12/1969 | Bragg | | F02C 7/042 137/15.2 |
| 3,527,408 A * | 9/1970 | Markowski | | B64C 29/0066 239/265.27 |
| 3,673,771 A | 7/1972 | Dickey | | |
| 3,778,983 A | 12/1973 | Rygg | | |
| 3,870,488 A * | 3/1975 | Arndt | | B01D 45/08 55/440 |
| 3,938,972 A * | 2/1976 | Sugimura | | B01D 45/08 55/440 |
| 3,950,156 A * | 4/1976 | Kall | | B01D 45/16 55/440 |
| 3,970,439 A | 7/1976 | Murphy | | |
| 3,979,903 A * | 9/1976 | Hull, Jr. | | F02C 7/05 415/145 |
| 3,998,048 A * | 12/1976 | Derue | | B64D 33/02 55/306 |
| 4,064,692 A * | 12/1977 | Johnson | | F02K 3/075 60/262 |
| 4,141,706 A * | 2/1979 | Regehr | | B01D 45/16 55/437 |
| 4,198,215 A * | 4/1980 | Regehr | | B01D 45/08 55/440 |
| 4,250,703 A * | 2/1981 | Norris | | B64D 33/02 244/53 B |
| 4,268,284 A | 5/1981 | Kent et al. | | |
| 4,397,431 A * | 8/1983 | Ben-Porat | | B64D 33/02 244/53 B |
| 4,581,051 A * | 4/1986 | Regehr | | B01D 45/16 55/440 |
| 4,704,145 A | 11/1987 | Norris et al. | | |
| 4,767,425 A * | 8/1988 | Camplin | | B01D 45/12 55/306 |
| 4,844,382 A * | 7/1989 | Raisbeck | | B64D 33/02 244/53 B |
| 4,877,430 A * | 10/1989 | Gutermuth | | B01D 45/06 55/434.4 |
| 5,112,375 A * | 5/1992 | Brown | | B01D 45/08 55/440 |
| 5,230,725 A * | 7/1993 | Chowaniec | | B01D 45/16 55/440 |
| 5,318,609 A * | 6/1994 | Kittler | | B01D 45/08 55/443 |
| 5,514,193 A * | 5/1996 | Schaal | | F24F 6/14 55/440 |
| 5,960,626 A * | 10/1999 | Baudu | | F02K 1/76 244/110 B |
| 6,499,285 B1 * | 12/2002 | Snyder | | B64D 33/02 244/53 B |
| 6,508,052 B1 * | 1/2003 | Snyder | | B01D 45/08 137/15.1 |
| 7,374,593 B2 | 5/2008 | Snyder | | |
| 7,927,408 B2 * | 4/2011 | Sheoran | | B01D 45/04 55/306 |
| 8,216,331 B2 * | 7/2012 | Muller | | B01D 46/08 55/434 |
| 9,206,740 B2 * | 12/2015 | Wong | | F01D 25/002 |
| 2008/0028935 A1 * | 2/2008 | Andersson | | B01D 45/04 95/272 |
| 2010/0011724 A1 * | 1/2010 | Xu | | B01D 45/08 55/459.1 |
| 2010/0206170 A1 * | 8/2010 | Geisner | | B01D 45/08 96/190 |
| 2010/0288890 A1 * | 11/2010 | Gatzke | | B64D 13/08 244/53 R |
| 2011/0011981 A1 * | 1/2011 | Vauchel | | B64D 33/02 244/134 B |
| 2011/0139000 A1 * | 6/2011 | Pavlatos | | B01D 45/12 95/78 |
| 2011/0173986 A1 * | 7/2011 | Jarrier | | F02C 7/055 60/772 |
| 2013/0092798 A1 | 4/2013 | Boyce | | |
| 2014/0144123 A1 * | 5/2014 | Judd | | B01D 45/04 60/39.092 |
| 2015/0113938 A1 * | 4/2015 | Kippel | | F02C 7/05 60/39.092 |
| 2015/0134151 A1 * | 5/2015 | Swann | | F02C 3/20 701/3 |
| 2015/0135661 A1 * | 5/2015 | MacDonald | | F24F 13/082 55/440 |
| 2015/0192298 A1 * | 7/2015 | Hasel | | F23R 3/02 60/774 |
| 2015/0266145 A1 * | 9/2015 | Valsler | | B01D 45/08 55/437 |
| 2016/0265435 A1 * | 9/2016 | Snyder | | F02C 7/057 |

OTHER PUBLICATIONS

Musgrove, G., et al. "Performance Measurements of a Unique Louver Particle Separator for Gas Turbine Engines," Journal of Engineering for Gas Turbines Power, 2012.
Extended EP Search Report for Application No. 16155604.8-1607 dated Jul. 22, 2016.

\* cited by examiner

MULTI-CHANNEL PARTICLE SEPARATOR

TECHNICAL FIELD

The present invention generally relates to inlet particle separator systems for gas turbine engines, and more particularly relates to a multi-channel particle separator (MCPS) for aircraft that include one or more gas turbine engines.

BACKGROUND

In many aircraft, the main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical and/or pneumatic power. An APU may also be used to start the propulsion engines.

Many APU-equipped aircraft are operated in environments that have a high concentration of fine dust particles (e.g., <30 µm) suspended in the air. These fine dust particles, when ingested by the APU, can adversely impact the APU. For example, the fine dust particles can plug the holes in effusion cooled combustors, and can plug and corrode the high temperature turbine passages and hardware. To alleviate the adverse impact of dust particles, many aircraft include an inlet particle separator system (IPS).

Most IPSs are designed to separate out relatively large particles (e.g., 100 µm<1000 µm) but are less efficient at separating out fine particles. This is because these systems typically rely on particle inertia to move the particles into a separate collector and scavenge system. Fine particles, with relatively lower inertia, are much more inclined to follow the inlet airflow into the gas turbine engine, resulting in low separation efficiencies. Thus, many aircraft additionally include one or more systems to remove these fine particles. These additional systems include barrier filters (self-cleaning and non-self-cleaning), vortex panels, and multi-channel particle separator (MCPS) systems.

Although the three particle separator systems just mentioned do excel at removing fine particles from APU inlet airflow, they all exhibit certain drawbacks. In particular, each is designed to be relatively large in size in order to minimize pressure losses. This size requirement negates the ability to mount these systems inside the already existing APU inlet duct system.

Hence, there is a need for a particle separator system that can remove fine dust particles from APU inlet airflow, exhibit minimal pressure losses, and be incorporated into the APU air inlet system. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-channel particle separator includes a plurality of vanes. Each vane is spaced apart from at least one other adjacent vane to define a flow channel. Each vane includes a leading edge, a trailing edge, a first side wall, a second sidewall, and a splitter. The first side wall extends between the leading edge and the trailing edge. The second side wall is spaced apart from the first side wall and extends from the leading edge toward the trailing edge. The splitter is rotationally coupled to the trailing edge and extends toward the leading edge. The splitter is spaced apart from the first side wall to define a scavenge volume and is rotatable between an extended position and a retracted position. In the extended position, the splitter is spaced apart from the second side wall to place the scavenge volume in fluid communication with the flow channel. In the retracted position, the splitter engages the second side wall to fluidly isolate the scavenge volume from the flow channel.

In another embodiment, a multi-channel particle separator includes a generally ring-shaped support structure and a plurality of vanes. The support structure has a particulate collection chamber formed therein, and is symmetrically disposed about a central axis. The vanes are coupled to the support structure and are symmetrically disposed around the central axis. Each vane is spaced apart from two other adjacent vanes to define a plurality of flow channels. Each vane includes a leading edge, a trailing edge, a first side wall, a second side wall, and a splitter. The leading edge is disposed parallel to the central axis. The first side wall extends between the leading edge and the trailing edge. The second side wall is spaced apart from the first side wall, and extends from the leading edge toward the trailing edge. The splitter is coupled to the trailing edge and extends toward the leading edge. The splitter is spaced apart from the first side wall to define a scavenge volume that is in fluid communication with the particulate chamber.

In yet another embodiment, a multi-channel particle separator includes a generally ring-shaped support structure, a plurality of particle collectors, and a plurality of vane sets. The ring-shaped structure is symmetrically disposed about a central axis, and has a plurality of evenly spaced-apart openings formed therein. The particle collectors are coupled to and extend perpendicularly from the support structure. Each particle collector has an inner surface that defines a particulate collection chamber that is in fluid communication with a different one of the openings. Each vane set includes a plurality of vanes that are coupled between two particle collectors and are spaced apart from at least one other adjacent vane to define a plurality of flow channels. Each vane includes a leading edge, a trailing edge, a first side wall, a second sidewall, and a splitter. The leading edge is disposed perpendicular to the central axis. The first side wall extends between the leading edge and the trailing edge. The second side wall is spaced apart from the first side wall, and extends from the leading edge toward the trailing edge. The splitter is coupled to the trailing edge and extends toward the leading edge. The splitter is spaced apart from the first side wall to define a scavenge volume that is in fluid communication with the particulate chamber.

Furthermore, other desirable features and characteristics of the multi-channel particle separator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
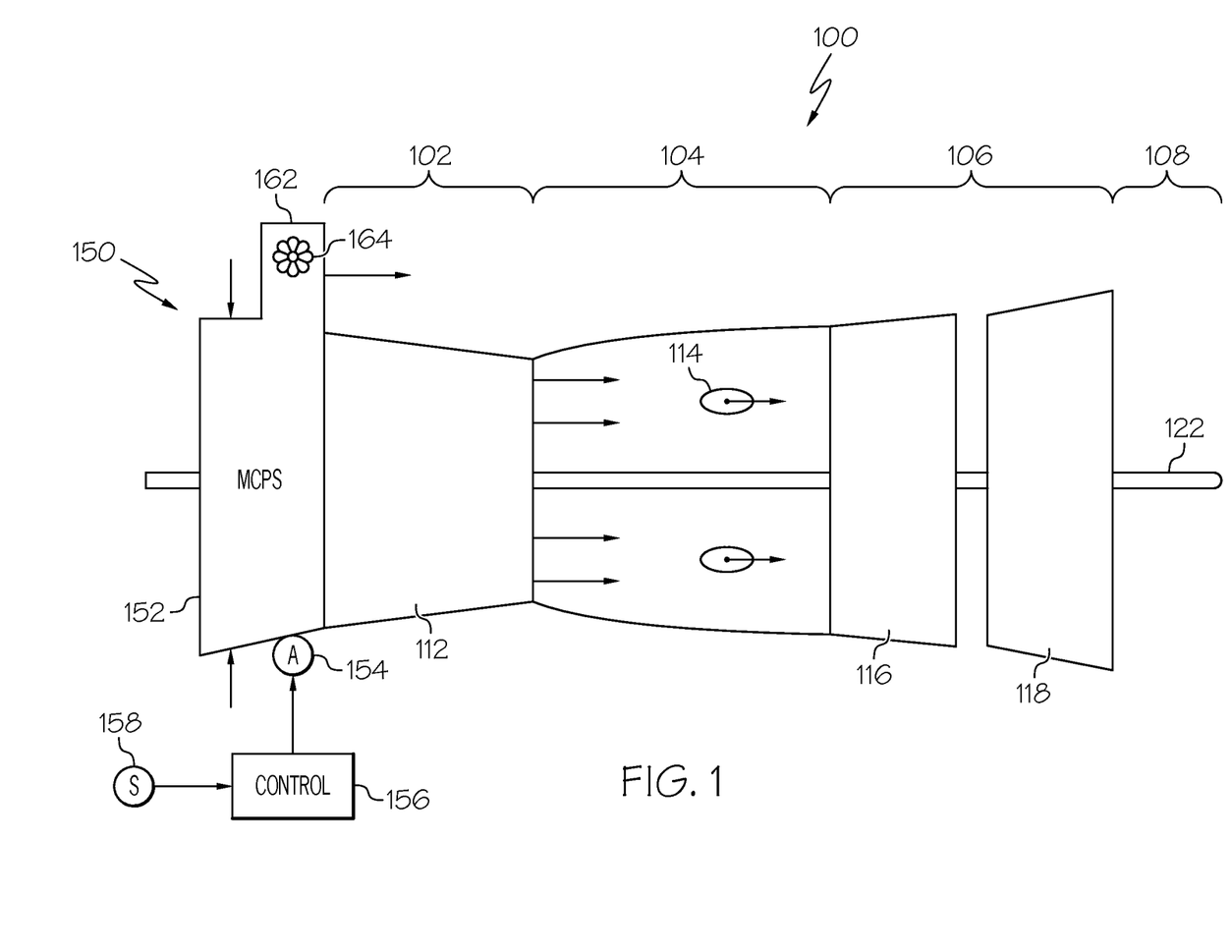
FIG. 1 is a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 104. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 108. The power shaft 122 may be used to drive various devices within the engine or vehicle. For example, in the context of a helicopter, the power shaft may be used to drive one or more rotors.

As FIG. 1 further depicts, the gas turbine engine 100 also includes an inlet particle separator system 150. The depicted inlet particle separator system 150 includes a multi-channel particle separator MCPS 152, an actuator 154, a control 156, and a sensor 158. The MCPS is 152 is coupled to, and is disposed upstream of, the compressor section 102. The air that the compressor section 102 draws into the engine 100 first enters the MCPS system 150. The MCPS 152, embodiments of which will be described in more detail further below, is configured to selectively separate at least a portion of any particulate that is suspended in the air that is drawn into the engine 100. The separated particulate, along with a portion of the air that is drawn into the engine 100, may be drawn into, for example, a scavenge scroll 162 via, for example, an air pump 164 (e.g., a blower or the like). The configuration of the MCPS 152 that allows the selective separation functionality will now be described.

Figure 2:
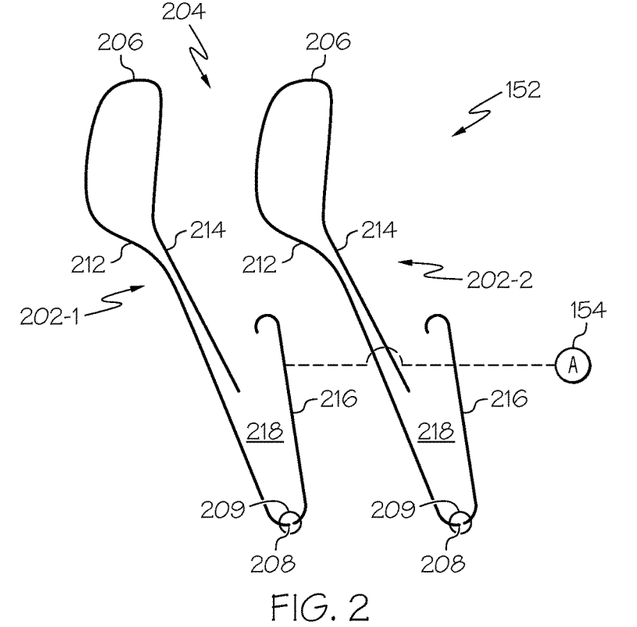
FIGS. 2 and 3 depict simplified representations of a portion of a multi-channel particle separator (MCPS) that may be used with the engine depicted in FIG. 1.
Figure 3:
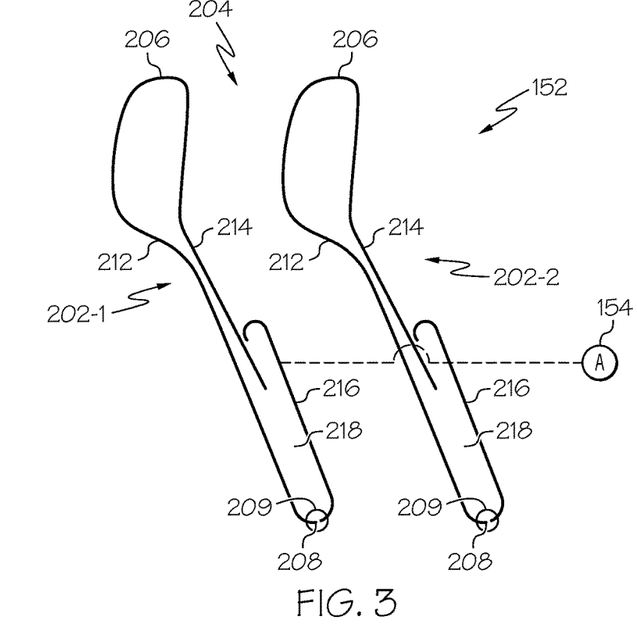

Turning to FIGS. 2 and 3, simplified representations of a portion of the MCPS 152 are depicted. The MCPS 152 includes a plurality of vanes 202 (202-1, 202-2 . . . ). Depending upon the specific configuration of the MCPS 152, variations of which are described further below, each vane 202 is spaced apart from at least one other adjacent vane 202 to define a flow channel 204. Each of the vanes 202 includes a leading edge 206, a trailing edge 208, a first side wall 212, a second side wall 214, and a splitter 216. Preferably, both the leading edge 206 and the trailing edge 208 are substantially rounded, though other shapes and configurations could be used. Regardless of the specific shape and configuration, it is seen that the first side wall 212 extends between the leading edge 206 and the trailing edge 208, and the second side wall 214 is spaced apart from the first side wall 212 and extends from leading edge 206 toward the trailing edge 208.

The splitter 216 is rotationally coupled to the trailing edge 208 via, for example, a hinge-type connection 209, and extends toward the leading edge 206. The splitter 216 is also spaced apart from the first side wall 206 to define a scavenge volume 218. The splitter 216, because it is rotationally coupled to the trailing edge 208, is rotatable between two positions—an extended position and a retracted position. In the extended position, which is the position depicted in FIG. 2, the splitter 216 is spaced apart from the second side wall 214 to place the scavenge volume 218 in fluid communication with the flow channel 204. In the retracted position, which is the position depicted in FIG. 3, the splitter 216 engages the second side wall 214 to fluidly isolate the scavenge volume 218 from the flow channel 204. As FIGS. 2 and 3 depict, and as will now be described, the splitter is moved between the extended and retracted position via the actuator 154, which is coupled to each splitter 216.

Returning now to FIG. 1, it is seen that only a single actuator 154 is depicted. It should be noted that this is merely exemplary of one embodiment and that in some embodiments two or more actuators 154 could be used to move the splitters 216. Regardless of the number of actuators that are used, the depicted actuator 154 is coupled to receive actuator control signals from the control 156. The actuator 154 is configured, in response to the actuator control signals, to move each splitter 216 to either the extended position or the retracted position. It will be appreciated that the actuator 154 may be implemented using any one of numerous actuators known in the art.

The control 156 is in operable communication with both the actuator 154 and the sensor 158. The control 156 receives a sensor signal from the sensor 158 and is configured, in response to the sensor signal, to supply the actuator control signals to the actuator 154. The sensor 158, which may be variously implemented, is configured to sense at least one parameter representative of a need for particle separation, and to supply a sensor signal that is representative thereof to the control 156.

It will be appreciated that the parameter (or parameters) that the sensor 158 is configured to sense, and the type of sensor, may vary. For example, the sensor 158 may be one or more of a particle sensor or, if the engine 100 is installed in an aircraft, an altitude sensor or a weight-on-wheels sensor, just to name a few. If the sensor 158 is a particle sensor, when the sensor signal supplied to the control 156 indicates, for example, that particulate concentration in the inlet air is above a threshold concentration, the control 156 will command the actuator 154 to move the splitters 216 to the extended positions. When the sensor signal supplied to the control 156 indicates that particulate concentration in the inlet air is below the threshold concentration, the control 156 will command the actuator 154 to move the splitters 216 to the retracted positions, and thereby reduce pressure loss across the MCPS 152. If the sensor 158 is configured to sense altitude or weight-on-wheels, the control 156 may be configured to command the actuator 154 to move the splitters 216 to the extended position at or below a threshold altitude or when the aircraft is on the ground, and to move the splitters 216 to the retracted position when the aircraft is at or above a threshold altitude or when the aircraft is not on the ground.

The MCPS 152, as noted above, may be variously configured and implemented. Two alternative configurations are depicted in FIGS. 4-9 and will now be described, beginning with the embodiment depicted in FIGS. 4 and 5.

Figure 4:
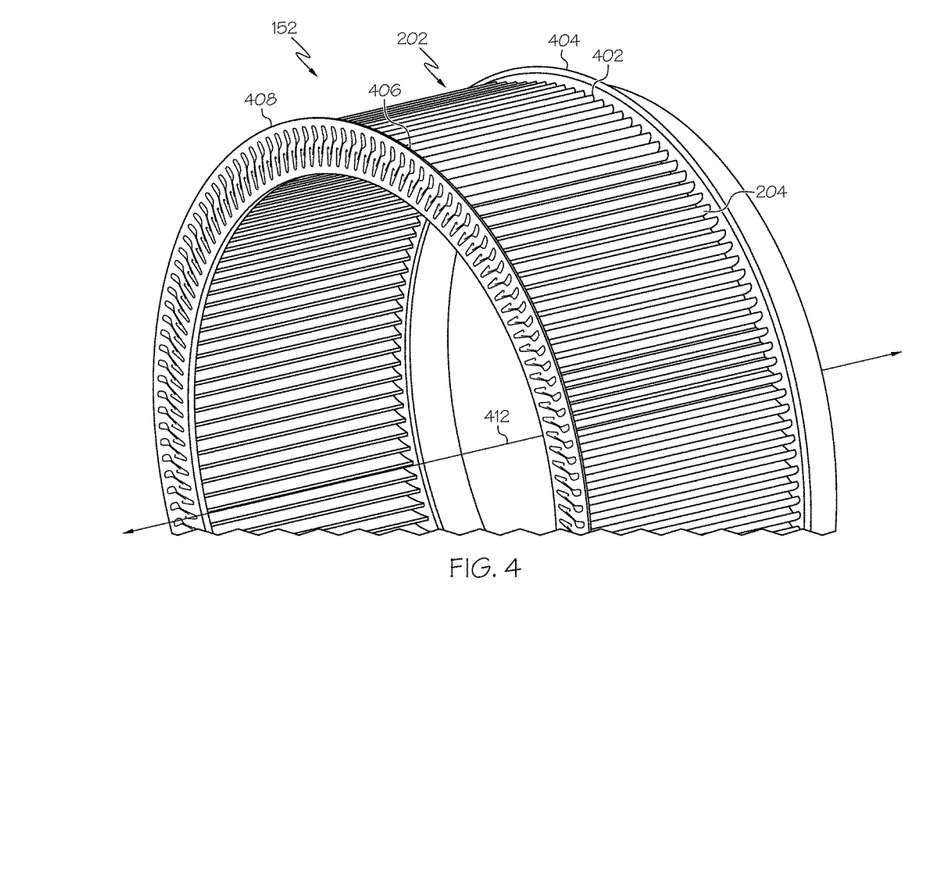
FIGS. 4 and 5 depict one physical embodiment of a MCPS that may be used with the engine depicted in FIG. 1.
Figure 5:
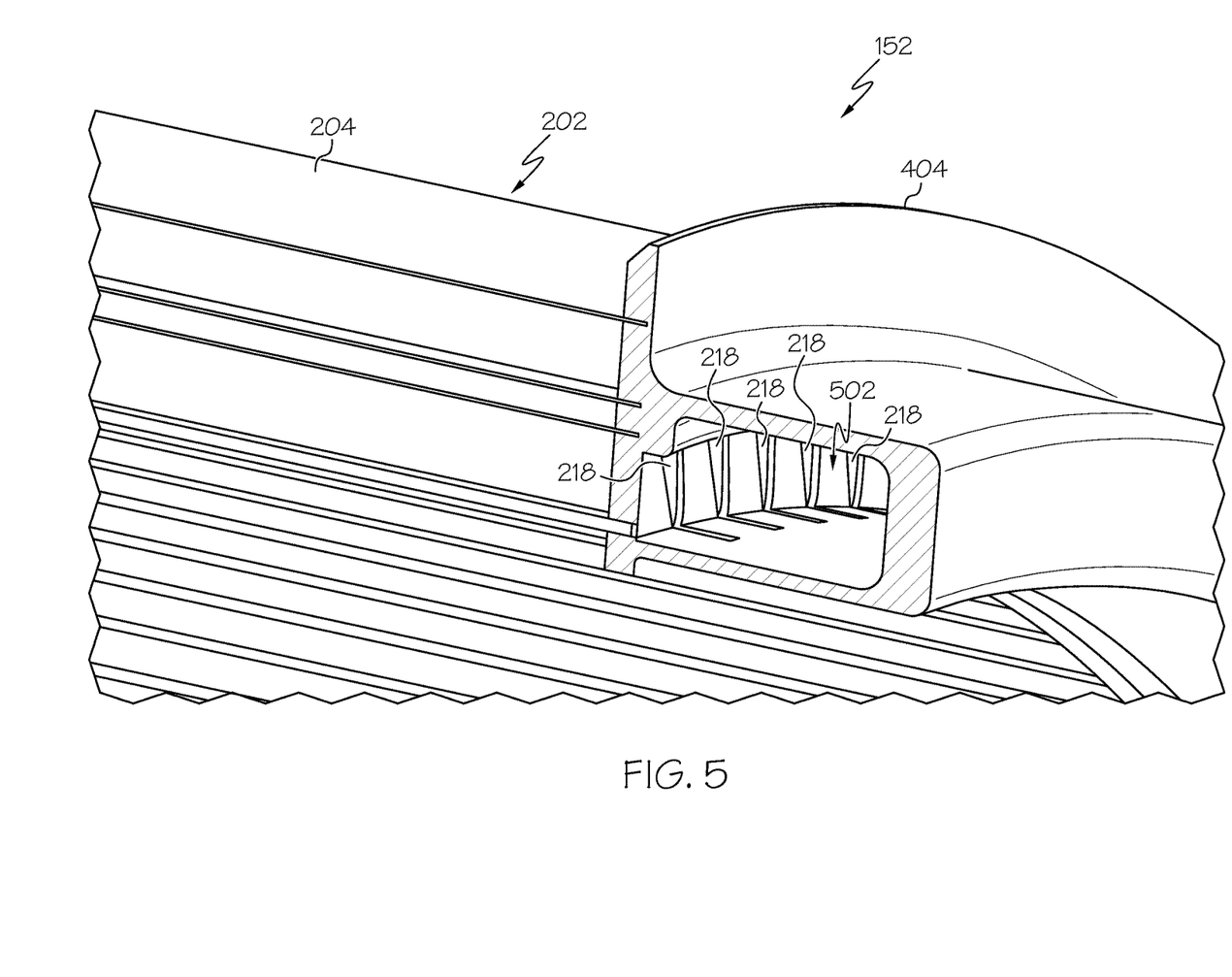

In the embodiment depicted in FIGS. 4 and 5, the vanes 202 are coupled between two support structures. In particular, one end 402 of each vane 202 is coupled to a first support structure 404, and the other end 406 of each vane 202 is coupled to a second support structure 408. It will be appreciated that the vanes 202, in some embodiments, could be coupled to only the first support structure 404.

The first support structure 404, as shown most clearly in FIG. 5, has a particulate collection chamber 502 formed therein. The particulate collection chamber 502 is in fluid communication with the scavenge volume 218 of each vane 202. In addition, the scavenge scroll 162 and air pump 164 (see FIG. 1) are preferably disposed in fluid communication with the particulate collection chamber 502. Thus, when the splitters 216 are in the extended position any particulate that is collected in the scavenge volumes 208 of the vanes 202 will be drawn into, and discharged from, the particulate collection chamber 502.

It is additionally seen that the first and second (if included) support structures 404, 408 are generally ring-shaped structures that are concentrically and symmetrically disposed about a central axis 412. The vanes 202 are also symmetrically disposed around the central axis 412, and the leading edge 204 of each vane 202 is disposed parallel to the central axis 412.

Figure 6:
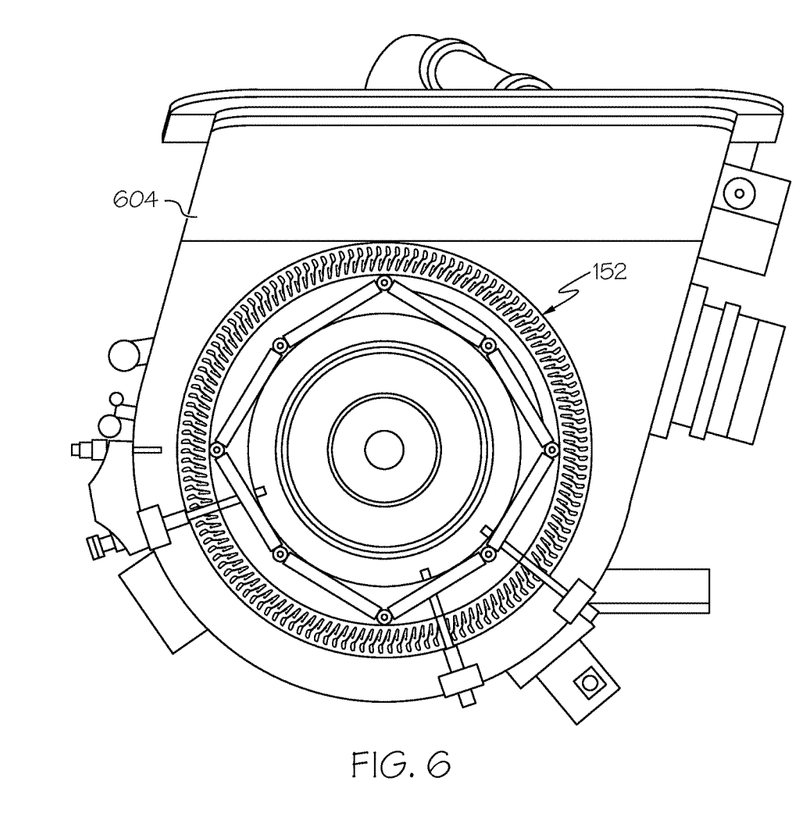
FIG. 6 depicts the MCPS of FIGS. 4 and 5 installed in an inlet plenum.

With this configuration, as shown more clearly in FIG. 6, the MCPS 152, when installed, is preferably disposed circumferentially around the rotational axis 602 of the engine 100. As such, the central axis 412 is aligned with the rotational axis 602. It will be appreciated that the depicted installation configuration is for an engine 100 that is configured as an auxiliary power unit (APU), and the MCPS 152 is installed in an APU inlet plenum 604. It has been found that the orientation of the flow channels 204 provide an angular flow exit, which may impart some bulk swirl to the air entering the compressor section 102. If needed, this bulk swirl can be eliminated by orienting the MCPS 152 as depicted in FIGS. 7 and 8.

Figure 7:
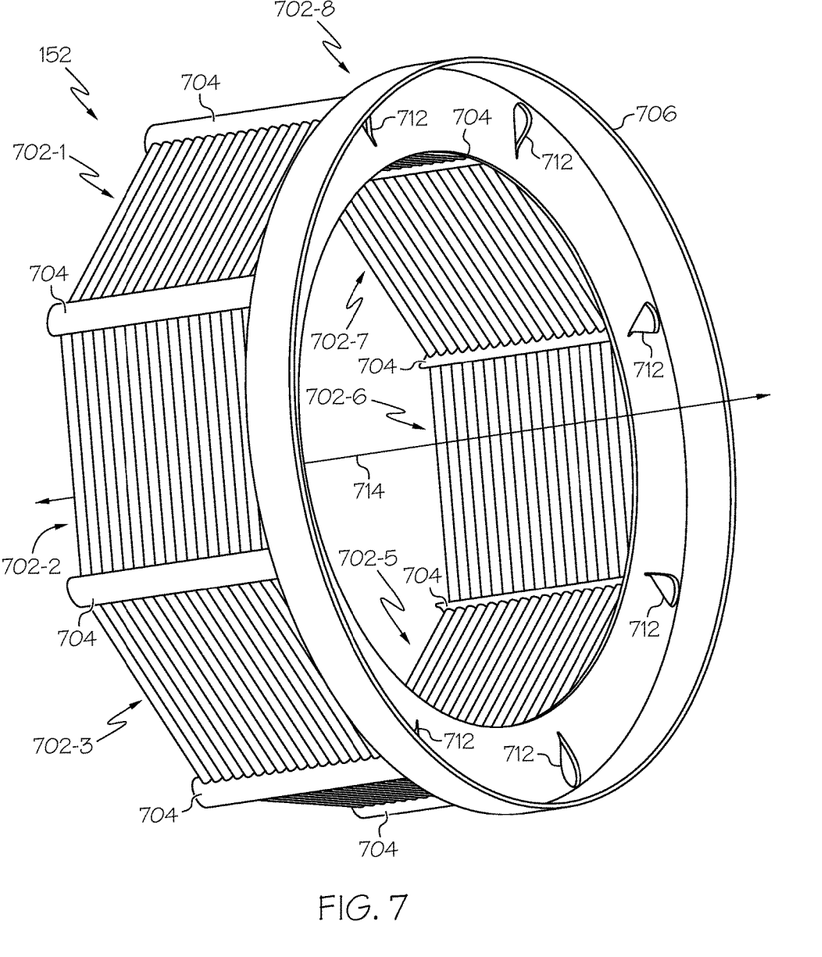
FIGS. 7 and 8 depict another physical embodiment of a MCPS that may be used with the engine depicted in FIG. 1.
Figure 8:
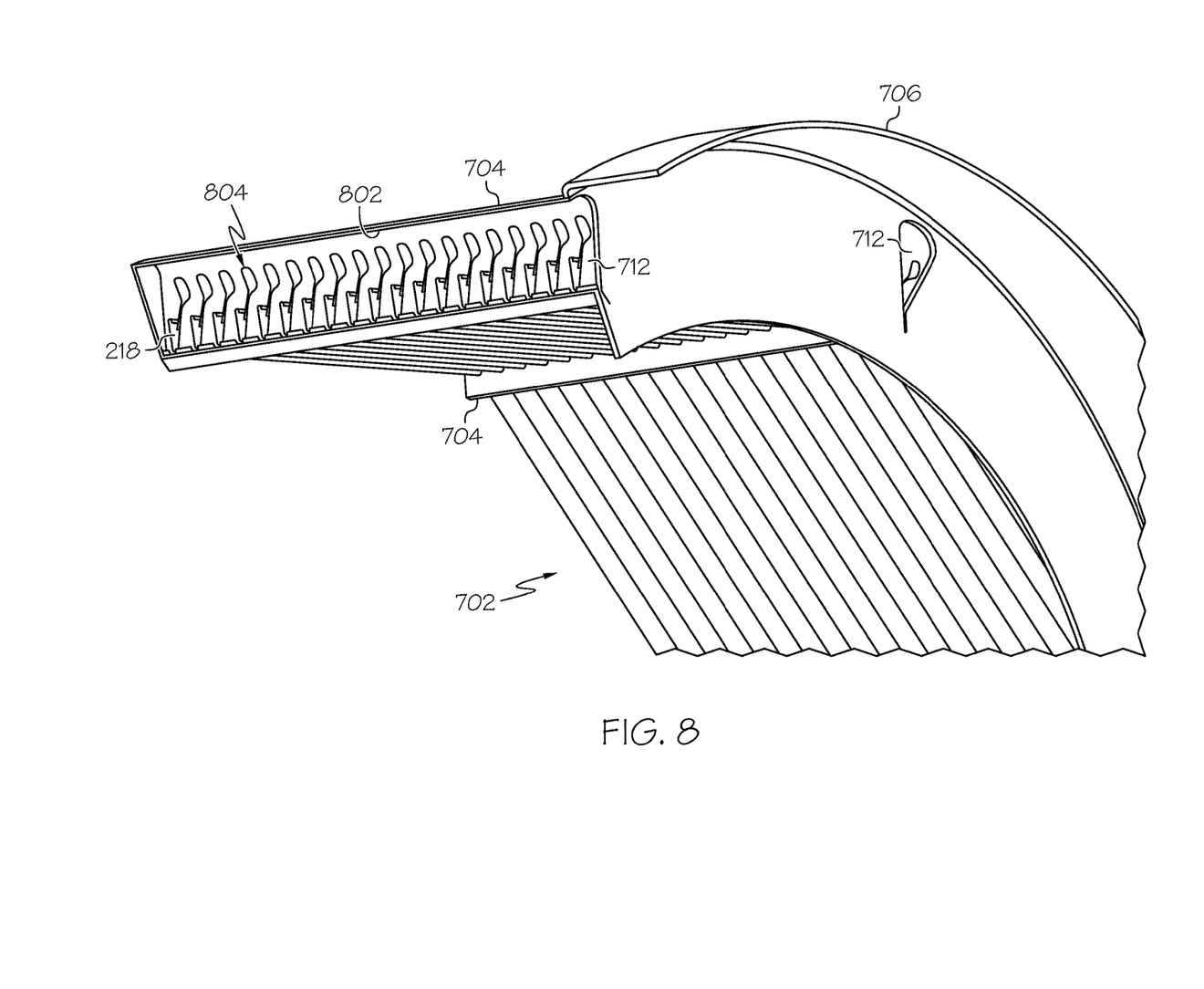
Figure 9:
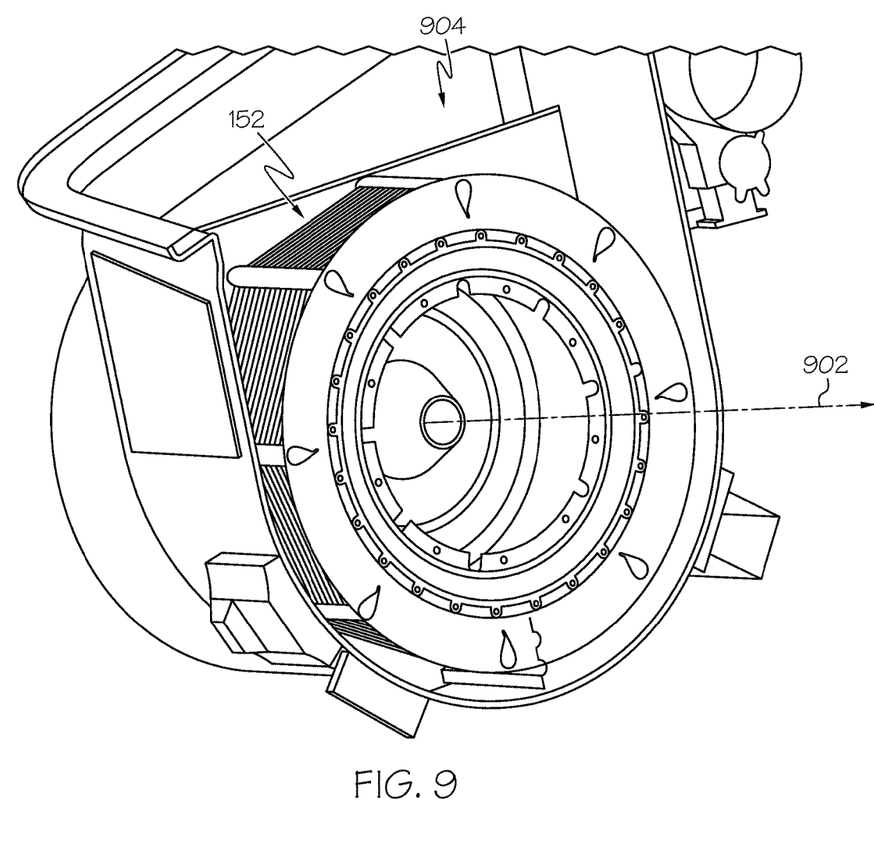
FIG. 9 depicts the MCPS of FIGS. 7 and 8 installed in an inlet plenum.

In the embodiment depicted in FIGS. 7 and 8, the vanes 202 are grouped together into sets of vanes 702 (702-1, 702-2, 702-3 . . . 702-8). Although the depicted embodiment includes eight sets of vanes 702, it will be appreciated that the MCPS 152 could be implemented with more or less than this number. Regardless of the number of sets 702, it is additionally seen that the MCPS 152 further includes a plurality of particle collectors 704 and a support structure 706.

Each particle collector 704 is coupled to two different sets of vanes 702. More specifically, each particle collector 704 is coupled to one of the ends of each vane 202 in a set of vanes 702, and to the other end of each vane 202 in another set of vanes 702. As FIG. 8 depicts, each particle collector 704 has an inner surface 802 that defines a particulate collection chamber 804. Each particulate collection chamber 804 is in fluid communication with the scavenge volume 218 of each vane 202 to which it is coupled.

The support structure 706 is coupled to each particle collector 704, and has a plurality of openings 712 formed therein. Each of these openings 712 is aligned with a different one of the particulate collection chambers 804. The support structure 706, as with the embodiment depicted in FIGS. 4-6, is a generally ring-shaped structure that is symmetrically disposed about a central axis 714, and the vanes 202 are disposed around this central axis 714. However, unlike the embodiment depicted in FIGS. 4-6, the leading edge 204 of each vane 202 is disposed perpendicular, rather than parallel, to the central axis 714.

The installation configuration of the MCPS 152 depicted in FIGS. 7 and 8 and described above is depicted in FIG. 9. As with the embodiment depicted in FIGS. 4-6, the MCPS 152 of this embodiment is also preferably disposed circumferentially around the rotational axis 902 of the engine 100 so that the central axis 714 is aligned with the rotational axis 902. The depicted installation configuration is again for an engine 100 that is configured as an auxiliary power unit (APU), and the MCPS 152 is installed in an APU inlet plenum 904.

Figure 10:
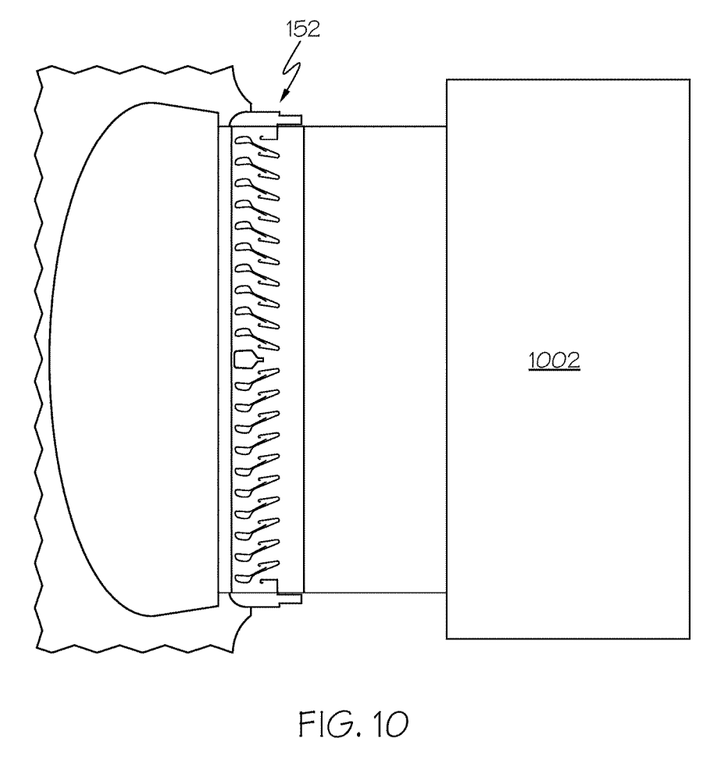
FIG. 10 depicts a MCPS arranged in front of an air/oil cooler.

The MCPS 152 embodiments described herein may be variously shaped. This flexibility allows for the MCPS 152 to be used in various other applications. One alternative application, which is depicted in FIG. 10, is in front of an air/oil cooler (AOC) 1002. The MCPS 152 will protect the AOC 1002 from particle plugging or damage. It will be appreciated that the arrangement of the vanes 202 could vary (cylindrical, linear, etc.), as needed or desired.

It will be appreciated that the MCPS 152 embodiments depicted in FIGS. 4-10 may be implemented using non-movable splitters 216. That is, the splitters 216 may be permanently disposed in the extended positions and not movable to the retracted position.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-channel particle separator, comprising:
a generally ring-shaped support structure symmetrically disposed about a central axis, the support structure having a plurality of evenly spaced-apart openings formed therein;
a plurality of particle collectors coupled to and extending perpendicularly from the support structure, each particle collector having an inner surface that defines a particulate collection chamber that is in fluid communication with a different one of the openings; and
a plurality of vane sets, each vane set including a plurality of vanes that are coupled between two particle collectors and that are spaced apart from at least one other adjacent vane to define a plurality of flow channels, each vane comprising:
a leading edge disposed perpendicular to the central axis,
a trailing edge,
a first side wall extending between the leading edge and the trailing edge;
a second side wall spaced apart from the first side wall, the second side wall extending from the leading edge toward the trailing edge, and
a splitter rotationally coupled to the trailing edge and extending toward the leading edge, the splitter spaced apart from the first side wall to define a scavenge volume that is in fluid communication with the particulate chamber.

2. The multi-channel particle separator of claim 1, wherein is:
each splitter is rotationally coupled to the trailing edge; and
each splitter is rotatable between (i) an extended position, in which the splitter is spaced apart from the second side wall to place the scavenge volume in fluid communication with the flow channel, and (ii) a retracted position, in which the splitter engages the second side wall to fluidly isolate the scavenge volume from the flow channel.

3. The multi-channel particle separator of claim 2, further comprising:
at least one actuator coupled to each splitter, the at least one actuator adapted to receive actuator control signals and configured, in response thereto, to move each splitter to either the extended position or the retracted position.

4. The multi-channel particle separator of claim 3, further comprising:
a control coupled to the at least one actuator and configured to supply the actuator control signals thereto.

5. The multi-channel particle separator of claim 4, further comprising:
a sensor in operable communication with the control, the sensor configured to sense at least one parameter representative of a need for particle separation and supply a sensor signal representative thereof to the control,
wherein the control is responsive to the sensor signal to supply the actuator control signals.

6. A gas turbine engine system, comprising:
a gas turbine engine having a rotational axis and including a compressor section, a combustion section, a turbine section, and an exhaust section;
at least one actuator coupled to receive actuator control signals and configured, in response thereto, to supply an actuation force;
a sensor configured to sense a parameter representative of aircraft altitude and supply a sensor signal representative thereof;
a control coupled to the at least one actuator and to the sensor, the control configured to receive the sensor signal and, in response to the sensor signal, to supply the actuator control signals to the at least one actuator; and
a multi-channel particle separator coupled to, and disposed upstream of the compressor section, the multi-channel particle separator comprising:
a generally ring-shaped support structure having a particulate collection chamber formed therein, the support structure coupled to the compressor section and symmetrically disposed around the rotational axis; and
a plurality of vanes coupled to the support structure and symmetrically disposed around the rotational axis, each vane spaced apart from two other adjacent vanes to define a plurality of flow channels, each vane comprising:
a leading edge disposed parallel to the rotational axis,
a trailing edge,
a first side wall extending between the leading edge and the trailing edge;
a second side wall spaced apart from the first side wall, the second side wall extending from the leading edge toward the trailing edge, and
a splitter rotationally coupled to the trailing edge and extending toward the leading edge, the splitter spaced apart from the first side wall to define a scavenge volume that is in fluid communication with the particulate chamber, the splitter coupled to receive the actuation force from the actuator and rotatable, upon receipt thereof, between (i) an extended position, in which the splitter is spaced apart from the second side wall to place the scavenge volume in fluid communication with the flow channel, and (ii) a retracted position, in which the splitter engages the second side wall to fluidly isolate the scavenge volume from the flow channel.

* * * * *